United States Patent Office 2,767,463
Patented Oct. 23, 1956

2,767,463

METALLO-CERAMIC COMPOSITIONS AND PROCESS OF PRODUCING SAME

Skon Tacvorian, Paris, France, assignor to "Office National d'Etudes et de Recherches Aeronautiques," Chatillon-sous-Bagneux, France No Drawing. Application April 15, 1952,
Serial No. 282,469

Claims priority, application France April 19, 1951

16 Claims. (Cl. 29—182.5)

This invention relates to metallo-ceramic compositions. This expression is used herein to designate compositions of matter comprising at least one metal component and at least one metal oxide component selected from within the class of oxides generally entering into the composition of ceramics, said components being intimately intermingled and bonded with one another on a microscopic scale. Such composite materials or compositions are known to exhibit properties intermediate between those of metals and ceramics.

Metallo-ceramic compositions possess utility wherever it is desired to obtain high resistance to corrosion and wear, oxidation and thermal impacts, that is sudden and large temperature variations.

It has been found, however, that the behaviour of known metallo-ceramic compositions, while satisfactory up to temperatures of about 1400° C., undergoes considerable deterioration at higher temperature ranges. This deterioration is apparently due to a failure in the mechanical characteristics of the matrix or continuum of the metallo-ceramic structure, which matrix usually comprises alumina or magnesia, the said failure occurring gradually as the temperature exceeds 1300° C. or so.

It is, accordingly, an object of this invention to provide an improved metallo-ceramic composition, and one which will retain its desirable characteristics at temperature ranges in excess of 1400° C.

It is another object to provide such a composition which will retain its characteristics even after a long period of service.

It is a further object of the invention to provide such a composition which will retain its characteristics despite repeated, large and sudden temperature variations.

It is yet another object of the invention to provide such a composition wherein the proportion of expensive constituents is comparatively low, so that the cost of the composition is kept down to within a permissible range.

An improved composition of matter according to the invention may be characterized in that its base, instead of comprising alumina and/or magnesia as in conventional compositions of comparable type, comprises a mixture of tetravalent refractory oxides such as zirconia and thoria, with zirconium metal or thorium metal.

The use of thoria as a base substance for a metallo-ceramic refractory composition has not, as far as the applicant is aware, been heretofore proposed.

The invention provides a means of practically producing metallo-ceramic and thoria-base refractory compositions which may be made to answer various predetermined requisites and are hence applicable to widely different technical problems.

The invention further includes the provision of metallo-ceramic compositions of the kind described, wherein the two tetravalent oxides are present in different amounts, the additional metal constituent being preferably that corresponding to the oxide present in lesser amount in the composition.

In most cases, the base oxide will be present in the composition in a molecular proportion substantially at least four times greater than the amount of the other refractory oxide used. The latter oxide will sometimes, for convenient reference, be designated as the auxiliary oxide. Where the base oxide is thoria, the relative ratio between the oxides is preferably greater than 8/1 by weight.

It should be understood that additional constituents, which may be added as hereafter described, may and often will modify the above-indicated ratio to a considerable extent.

A grave difficulty has been encountered in the prior art when it was attempted to use zirconia-containing compositions, in that this substance will usually pass through various allotropic states as the temperature rises or falls. This difficulty is considerably reduced or eliminated according to the invention owing to the presence of thoria along with the zirconia, because the thoria is found to promote stability of one of the specific allotropic forms of zirconia, namely, the cubic form, owing to the fact that the thoria is isomorphous therewith.

Further according to the invention, the composition is produced by a sintering process in such a way that the auxiliary oxide will at least partially be produced in situ, from the metal.

In one aspect of the invention, an improved metallo-ceramic composition may in addition to thoria and zirconia (and thorium or zirconium), further comprise one or more additional oxides such as MgO, CaO, SrO, $CeO_2$, $HfO_2$, and the like. The additional oxides may be selected such as to be capable of forming with the zirconia a crystalline compound presenting stability with respect to temperature changes, or may be selected with a view to reducing the over-all production cost of the final product.

Thus, for instance, the addition of magnesia will result in the formation of zirconate, crystallizing in the cubic form, which will remain stable despite temperature variations. Such addition of further oxides is particularly desirable where the amount of thoria used is insufficient for stabilizing the zirconia in its cubic form.

A composition according to the invention may further comprise one or more additional metals selected from within the class consisting of the sixth group of the periodic table, namely chromium, molybdenum, tungsten, or from the iron group, namely, nickel, iron, and cobalt. The addition of such a metal or metals makes it possible to bring the thermal coefficient of expansion of the metallic phase therein to a value approximating that of the ceramic phase.

As a rule, moreover, such addition of a metal will reduce the production cost of the composition.

Such metals are adapted to modify the density of the final composition and properly selected additional metals may serve to increase the refractory feature of the final product.

Compositions according to the invention may be produced by the conventional powder-metallurgical or sintering methods. Thus, the constituents in the form of fine powders, dry or humidified, may be mixed so as to obtain a highly smooth and homogeneous mixture. This mixture is formed to a desired shape by molding, press-molding, extrusion or casting. The molded article is then sintered in an appropriate controlled atmosphere or in vacuo; the composition of the gaseous atmosphere may be modified during the process. The sintering step is conducted at a temperature within the range of from 1500° C. to 2000° C.

(A) THORIA-BASE COMPOSITIONS

Example I

|  | Percent |
|---|---|
| ThO | 60 |
| $CeO_2$ | 6 |
| $ZrO_2$ | 1 |
| Zr | 3 |
| W or Mo | 20 |
| Ni | 10 |

The thoria and ceria used are obtained by calcining co-precipitated oxalates, in a relative proportion of 90% thoria and 10% ceria. The mixture is heated to 1800° C., whereupon the ceria and thoria enter into solid solution.

As for zirconium, it is partially oxidized and the zirconia-coated zirconium thus obtained is mixed with tungstene or molybdenum and nickel. The mixture is added to the above-described mixture of zirconia and thoria. The resulting compound is formed by press-molding, or the like, and then sintered in a current of argon at 1700° C. A material is then obtained having the above given composition.

Example II

| | | |
|---|---|---|
| ThO | percent | 70 |
| $ZrO_2$ | | Trace |
| Zr | percent | 5 |
| Mo | do | 25 |

The sintering temperature is about 1650° C.

Example III

|  | Percent |
|---|---|
| $ThO_2$ | 45 |
| $ZrO_2$ | 2 |
| Zr | 3 |
| Ni | 10 |
| Mo or W | 40 |

The sintering temperature is about 1800° C.

Example IV

|  | Percent |
|---|---|
| $ThO_2$ | 40 |
| $ZrO_2$ | 0.1 |
| Zr | 5 |
| Cr | 54.9 |

The thoria used is a product obtained from calcination of thorium oxalate and having the following granulometric analysism 90% under 3 μ; remainder under 10 μ.

The zirconium and the chromium used are in the form of industrial powders. The sintering step is carried out in an atmosphere of argon or hydrogen, free of nitrogen and rendered slightly oxidizing by the addition thereinto of a controlled degree of moisture, so that the sintered product will contain 0.1% of $ZrO_2$ formed from the zirconium introduced. The sintering temperature is about 1700° C.

Example V

|  | Percent |
|---|---|
| $ThO_2$ | 56 |
| Zr | 40 |
| $ZrO_2$ | 4 |

The sintering temperature is about 1600° C.

In the above compositions, the zirconia may be formed either by oxidation in situ during sintering, or by a preliminary partial oxidation of the zirconium, or it may be introduced as a separate constituent in the initial mixture.

(B) ZIRCONIA-BASE COMPOSITIONS

Example VI

|  | Percent |
|---|---|
| $ZrO_2$ | 50 |
| $ThO_2$ | 2 |
| MgO | 5 |
| Th | 43 |

The sintering temperature is about 1700° C. and the sintering step is conducted in vacuo. The MgO may, if desired, be provided in the form of a carbonate or a hydrate.

Example VII

| | | |
|---|---|---|
| $ZrO_2$ | percent | 40 |
| $ThO_2$ | | Trace |
| MgO | percent | 5 |
| Th | do | 5 |
| Cr | do | 50 |

The sintering temperature is about 1600° C.

Example VIII

|  | Percent |
|---|---|
| $ZrO_2$ | 70 |
| $ThO_2$ | 2 |
| $CaO_2$ | 5 |
| Th | 3 |
| Ni | 20 |

The sintering temperature is about 1500° C.

In the above compositions, the thoria may be formed either by oxidation in situ during sintering, or by preliminary partial oxidation of the thorium, or it may be supplied as a separate constituent in the initial mixture.

The above mixtures are sintered, either in vacuo or in an atmosphere of hydrogen or argon. Oxygen or nitrogen may be added in variable amounts if desired.

I claim:

1. A process for manufacturing a sintered metallo-ceramic body which comprises sintering a mixture of oxide of thorium and of zirconium in the temperature range of from 1500–2000° C. and in an atmosphere having a controlled supply of oxygen capable of transforming a portion of the zirconium into oxide of zirconium.

2. A process for manufacturing a sintered metallo-ceramic body which comprises sintering a mixture of oxide of zirconium and of thorium in the temperature range of from 1500–2000° C. and in an atmosphere having a controlled supply of oxygen capable of transforming a portion of the thorium into oxide of thorium.

3. A sintered metalloc-ceramic composition consisting of thoria and zirconia in a proportion higher than 40% of the whole, the thoria being in amount substantially greater than said zirconia, and zirconium.

4. A sintered metallo-ceramic composition consisting of thoria and zirconia in a proportion higher than 40% of the whole, the zirconia being in an amount substantially greater than said thoria, and thorium.

5. A sintered metallo-ceramic composition consisting of thorium and zirconium oxides in a proportion higher than 40% by weight of the whole, a metal of said oxides, and an additional oxide selected from the class consisting of MgO, CaO, SrO, $CeO_2$ and $HfO_2$.

6. A sintered metallo-ceramic composition consisting of thorium and zirconium oxides in a proportion higher than 40% by weight of the whole, a metal of said oxides, and a metal selected from the class consisting of the metals of Group VI and the iron group.

7. A sintered metallo-ceramic composition comprising substantially:

|  | Percent |
|---|---|
| $ThO_2$ | 60 |
| $CeO_2$ | 6 |
| $ZrO_2$ | 1 |
| Zr | 3 |
| W | 20 |
| Ni | 10 |

8. A sintered metallo-ceramic composition comprising substantially:

| | Percent |
|---|---|
| $ThO_2$ | 45 |
| $ZrO_2$ | 2 |
| Zr | 3 |
| Ni | 10 |
| W | 40 |

9. A sintered metallo-ceramic composition which comprises substantially:

| | Percent |
|---|---|
| $ThO_2$ | 60 |
| $CeO_2$ | 6 |
| $ZrO_2$ | 1 |
| Zr | 3 |
| Mo | 20 |
| Ni | 10 |

10. A sintered metallo-ceramic composition which comprises substantially:

| | | |
|---|---|---|
| $ThO_2$ | percent | 70 |
| $ZrO_2$ | | Trace |
| Zr | percent | 5 |
| Mo | do | 25 |

11. A sintered metallo-ceramic composition which comprises substantially:

| | Percent |
|---|---|
| $ThO_2$ | 45 |
| $ZrO_2$ | 2 |
| Zr | 3 |
| Ni | 10 |
| Mo | 40 |

12. A sintered metallo-ceramic composition which comprises substantially:

| | Percent |
|---|---|
| $ThO_2$ | 40 |
| $ZrO_2$ | 0.1 |
| Zr | 5 |
| Cr | 54.9 |

13. A sintered metallo-ceramic composition which comprises substantially:

| | Percent |
|---|---|
| $ThO_2$ | 56 |
| Zr | 40 |
| $ZrO_2$ | 4 |

14. A sintered metallo-ceramic composition which comprises substantially:

| | Percent |
|---|---|
| $ZrO_2$ | 50 |
| $ThO_2$ | 2 |
| MgO | 5 |
| Th | 43 |

15. A sintered metallo-ceramic composition which comprises substantially:

| | | |
|---|---|---|
| $ZrO_2$ | percent | 40 |
| $ThO_2$ | | Trace |
| MgO | percent | 5 |
| Th | do | 5 |
| Cr | do | 50 |

16. A sintered metallo-ceramic composition which comprises substantially:

| | Percent |
|---|---|
| $ZrO_2$ | 70 |
| $ThO_2$ | 2 |
| CaO | 5 |
| Th | 3 |
| Ni | 20 |

References Cited in the file of this patent

UNITED STATES PATENTS

| 661,610 | Kellner | Nov. 13, 1900 |
| 917,159 | Schilling | Apr. 6, 1909 |
| 982,751 | Thowless | Jan. 24, 1911 |
| 1,086,428 | von Welsbach | Feb. 10, 1914 |
| 1,109,887 | von Welsbach | Sept. 8, 1914 |
| 1,205,080 | Baumann | Nov. 14, 1916 |
| 1,663,553 | Iredell | Mar. 27, 1928 |
| 1,790,918 | Hauser | Feb. 3, 1931 |
| 2,431,660 | Gaudenzi | Nov. 25, 1947 |
| 2,581,252 | Goetzel | Jan. 1, 1952 |

OTHER REFERENCES

Hauser: Ceramic Industry, November 1946, pages 90, 92 and 94.

Johnson: Journal of the American Ceramic Society, May 1950, page 170.

Cronin: Ceramic Bulletin, July 1951, pages 234–238.